US008929902B2

(12) United States Patent
Charbit et al.

(10) Patent No.: US 8,929,902 B2
(45) Date of Patent: Jan. 6, 2015

(54) METHOD AND APPARATUS FOR DYNAMIC VEHICULAR COMMUNICATIONS

(75) Inventors: Gilles Charbit, Farnborough (GB); Matti Kullervo Jokimies, Salo (FI)

(73) Assignee: Broadcom Corporation, Irvine, CA (US)

( * ) Notice: Subject to any disclaimer, the term of this patent is extended or adjusted under 35 U.S.C. 154(b) by 213 days.

(21) Appl. No.: 13/431,370

(22) Filed: Mar. 27, 2012

(65) Prior Publication Data

US 2013/0252613 A1 Sep. 26, 2013

(30) Foreign Application Priority Data

Mar. 21, 2012 (GB) .................................. 1204943.3

(51) Int. Cl.
*H04W 72/00* (2009.01)
(52) U.S. Cl.
USPC ..................... 455/450; 455/435.2; 455/435.1; 455/437; 455/452.1; 455/452.2; 370/389
(58) Field of Classification Search
CPC ..... H04W 36/04; H04W 36/06; H04W 36/08; H04W 36/14; H04W 36/20; H04W 36/24; H04W 36/26; H04W 36/30; H04W 36/32; H04W 36/38; H04W 52/40
USPC ................ 455/435.2, 435.1, 437, 450, 452.1, 455/452.2; 370/389
See application file for complete search history.

(56) References Cited

U.S. PATENT DOCUMENTS

| 5,594,432 A | 1/1997 | Oliva et al. |
| 5,621,685 A | 4/1997 | Cernea et al. |
| 6,337,978 B1 | 1/2002 | Inoue |
| 2003/0087643 A1 | 5/2003 | Mazzara |
| 2004/0203436 A1 | 10/2004 | Oesterling |
| 2011/0013586 A1* | 1/2011 | Oh et al. ......................... 370/331 |
| 2012/0057490 A1* | 3/2012 | Park et al. ...................... 370/252 |
| 2013/0114577 A1* | 5/2013 | Cai et al. ....................... 370/336 |

FOREIGN PATENT DOCUMENTS

| WO | WO 99/35628 A1 | 7/1999 |
| WO | WO 02/071652 A2 | 9/2002 |
| WO | WO 2008/092475 A1 | 8/2008 |

OTHER PUBLICATIONS

Search Report from Great Britain Patent Application No. GB1204943.3 dated Jul. 20, 2012.
Intelligent Transportation System—Wikipedia, the free encyclopedia; downloaded at : http://en.wikipedia.org/wiki/Intelligent_transportation_system on Apr. 16, 2012; pp. 1-8.

(Continued)

*Primary Examiner* — Amanico Gonzalez
(74) *Attorney, Agent, or Firm* — Stanton IP Law

(57) ABSTRACT

A method, apparatus and computer program product are therefore provided according to an example embodiment to provide a cellular based ITS environment. In this regard, a method includes causing a secondary cell carrier (SCC) to be configured for a mobile terminal located in a vehicular target area. The method of this embodiment may also include causing the SCC to be activated by signaling a vehicular fast activation block (VFAB). The method of this embodiment may also include causing the SCC to deactivate based on a signal strength measurement, received from a road side unit (RSU), in an instance in which the signal strength measurement does not satisfy a predetermined threshold over a measurement period based on a timer.

20 Claims, 5 Drawing Sheets

(56) References Cited

OTHER PUBLICATIONS

Uzcategui, Roberto A., et al.; Topics in Automotive Networking, Wave: A Tutorial; IEEE Communications Magazine; May 2009; pp. 126-133.

Draft ETSI TR 102 898 V<0.4.0> (Sep. 2010); Machine to Machine Communications (M2M); Use cases of Automotive Applications in M2M capable networks; pp. 1-17.

* cited by examiner

METHOD AND APPARATUS FOR DYNAMIC VEHICULAR COMMUNICATIONS

CROSS-REFERENCE TO RELATED APPLICATIONS

This application is based upon and claims the benefit of priority from the prior UK Patent Application No. 1204943.3, filed on Mar. 21, 2012, the entire contents of which are incorporated herein by reference.

TECHNOLOGICAL FIELD

Embodiments of the present invention relate generally to intelligent transportation system technology and, more particularly, to cellular based intelligent transportation systems.

BACKGROUND

Intelligent transportation systems (ITS) are configured to automate interactions between vehicles in order to achieve greater levels of safety, security and efficiency. For example, an ITS may enable a mobile terminal on an emergency vehicle to notify surrounding vehicles and/or upcoming traffic of its approach. Advantageously the notification may cause an alert and may even attempt to slow nearby vehicles to allow for the safe passage of the emergency vehicle. Other embodiments of an ITS may include setting variable speed limits, reporting traffic flow and/or the like.

In order to provide wireless access in vehicular environments, a Wireless Access Vehicular Environment (WAVE) system architecture was developed. A WAVE system consists of road side units (RSUs) usually positioned along roads and mobile terminals (e.g., on board units or OBUs) mounted in vehicles The RSUs and mobile terminals may form WAVE basic service sets (WBSSs) connected to the Wide Area Network (WAN) via an appropriate portal. Such a portal may be implemented via cable linking the RSU and the WAN, but this may, for example, add significantly to cost of implementing an ITS system. Another version of a WAVE system may be implemented wirelessly over an ITS band. Over time, the use of the wireless band has proven, for example, to starve an ITS-Dedicated Short Range Communications (DSRC) system of frequency resources. The ITS-DSRC is customarily deployed over 75 MHz of bandwidth in a relatively high-frequency band around 5.9 GHz in 10-20 MHz channel bandwidth, and therefore may not be suited for potentially long transmission range due to path loss. Additionally, increasing transmission power of the RSU-WAN link to account for the transmission range may lead to significant interference issues for the RSU-mobile terminal link. Other current wireless solutions, such as those solutions used in current cellular networks are generally not suitable for an ITS environment due to the potential speed and high mobility of a mobile terminal as well as the generally small size of some RSU cells.

BRIEF SUMMARY

In one embodiment, a method is provided that comprises causing a secondary cell carrier (SCC) to be configured for a mobile terminal located in a vehicular target area. The method of this embodiment may also include causing the SCC to be activated by signaling a vehicular fast activation block (VFAB). The method of this embodiment may also include causing the SCC to deactivate based on a signal strength measurement, received from a road side unit (RSU), in an instance in which the signal strength measurement does not satisfy a predetermined threshold over a measurement period based on a timer.

In another embodiment, an apparatus is provided that includes at least one processor and at least one memory including computer program code with the at least one memory and the computer program code being configured, with the at least one processor, to cause the apparatus to at least cause a SCC to be configured for a mobile terminal located in a vehicular target area. The at least one memory and computer program code may also be configured to, with the at least one processor, cause the apparatus to cause the SCC to be activated by signaling a VFAB. The at least one memory and computer program code may also be configured to, with the at least one processor, cause the apparatus to cause the SCC to deactivate based on a signal strength measurement, received from a RSU, in an instance in which the signal strength measurement does not satisfy a predetermined threshold over a measurement period based on a timer.

In the further embodiment, a computer program product may be provided that includes at least one non-transitory computer-readable storage medium having computer-readable program instructions stored therein with the computer-readable program instructions including program instructions configured to cause a SCC to be configured for a mobile terminal located in a vehicular target area. The computer-readable program instructions may also include program instructions configured to cause the SCC to be activated by signaling a VFAB. The computer-readable program instructions may also include program instructions configured to cause the SCC to deactivate based on a signal strength measurement, received from a RSU, in an instance in which the signal strength measurement does not satisfy a predetermined threshold over a measurement period based on a timer.

In yet another embodiment, an apparatus is provided that includes means for causing a SCC to be configured for a mobile terminal located in a vehicular target area. The apparatus of this embodiment may also include means for causing the SCC to be activated by signaling a VFAB. The apparatus of this embodiment may also include means for causing the SCC to deactivate based on a signal strength measurement, received from a RSU, in an instance in which the signal strength measurement does not satisfy a predetermined threshold over a measurement period based on a timer.

In one embodiment, a method is provided that comprises causing a search for a VFAB in an instance in which a message is received that indicates that at least one RSU is within communications range. The method of this embodiment may also include causing a connection with a RSU via a SCC to be activated based on a received VFAB. The method of this embodiment may also include causing the connection with an RSU via the SCC to be de-activated in an instance in which the signal strength measurement for the SCC does not satisfy a predetermined threshold over a measurement period based on a timer.

In another embodiment, an apparatus is provided that includes at least one processor and at least one memory including computer program code with the at least one memory and the computer program code being configured, with the at least one processor, to cause the apparatus to at least cause a search for a VFAB in an instance in which a message is received that indicates that at least one RSU is within communications range. The at least one memory and computer program code may also be configured to, with the at least one processor, cause the apparatus to cause a connection with a RSU via a SCC to be activated based on a received VFAB. The at least one memory and computer program code may also be configured to, with the at least one processor, cause the apparatus to cause the connection with an RSU via the SCC to be de-activated in an instance in which the signal strength measurement for the SCC does not satisfy a predetermined threshold over a measurement period based on a timer.

In the further embodiment, a computer program product may be provided that includes at least one non-transitory computer-readable storage medium having computer-readable program instructions stored therein with the computer-readable program instructions including program instructions configured to cause a search for a VFAB in an instance in which a message is received that indicates that at least one RSU is within communications range. The computer-readable program instructions may also include program instructions configured to cause a connection with a RSU via a SCC to be activated based on a received VFAB. The computer-readable program instructions may also include program instructions configured to cause the connection with an RSU via the SCC to be de-activated in an instance in which the signal strength measurement for the SCC does not satisfy a predetermined threshold over a measurement period based on a timer.

In yet another embodiment, an apparatus is provided that includes means for causing a search for a VFAB in an instance in which a message is received that indicates that at least one RSU is within communications range. The apparatus of this embodiment may also include means for causing a connection with a RSU via a SCC to be activated based on a received VFAB. The apparatus of this embodiment may also include means for causing the connection with an RSU via the SCC to be de-activated in an instance in which the signal strength measurement for the SCC does not satisfy a predetermined threshold over a measurement period based on a timer.

BRIEF DESCRIPTION OF THE DRAWINGS

Figure 1:
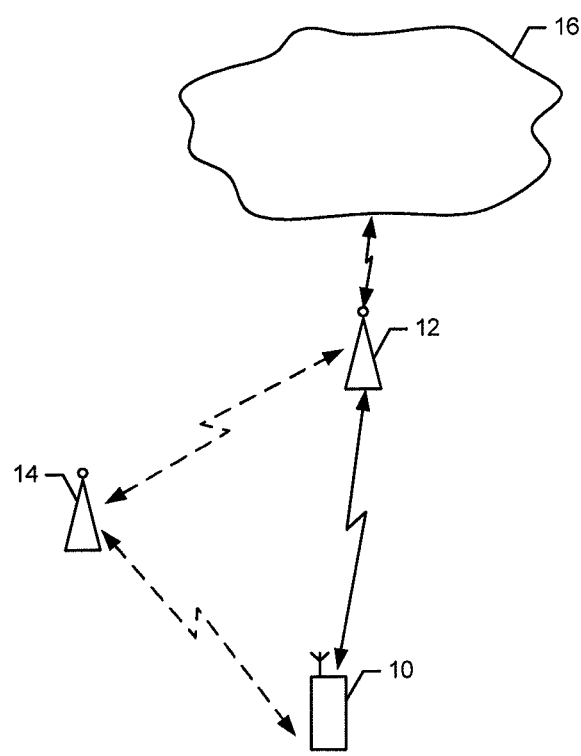
Figure 2:
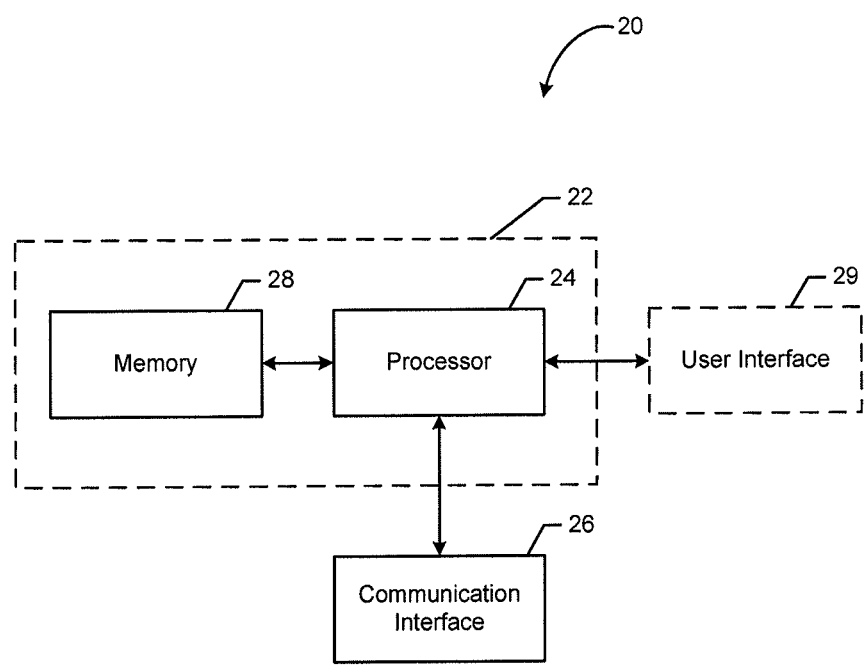
Figure 3:
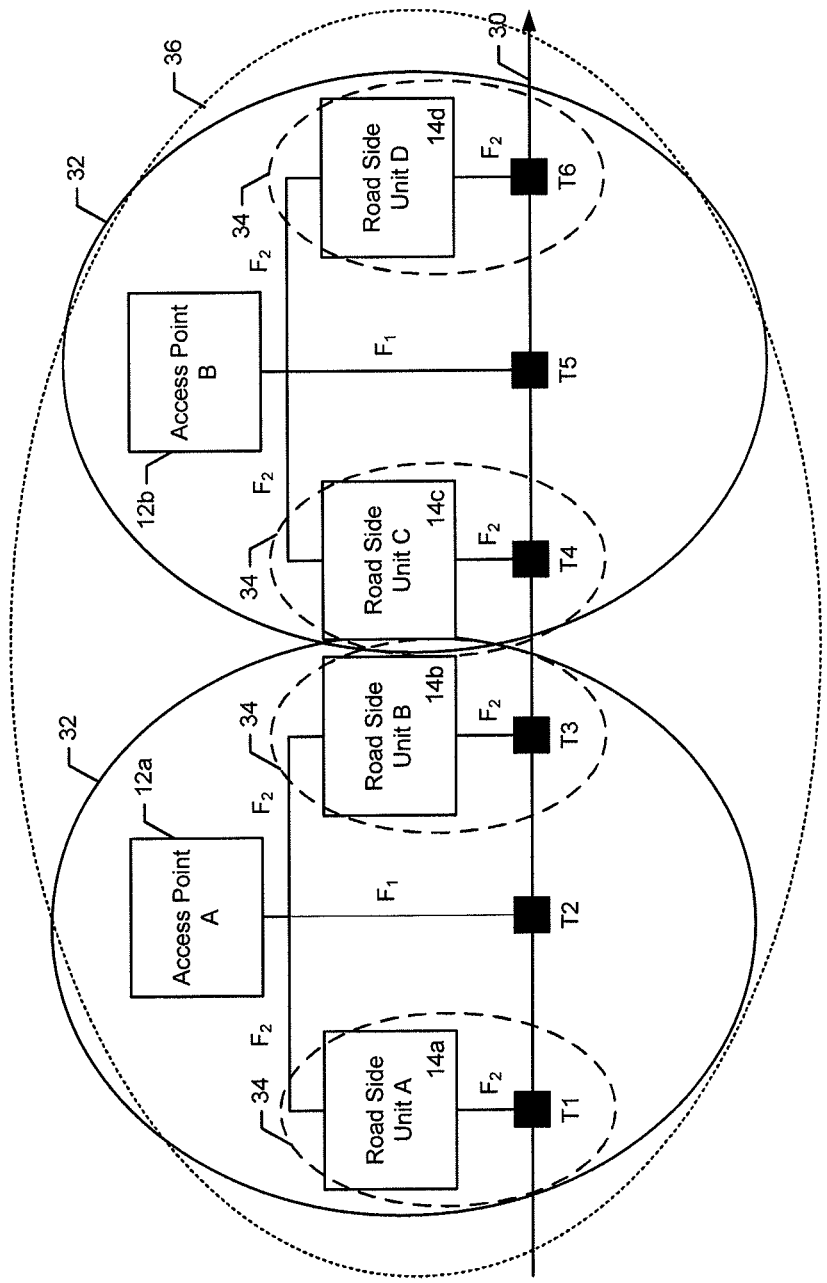
Figure 4:
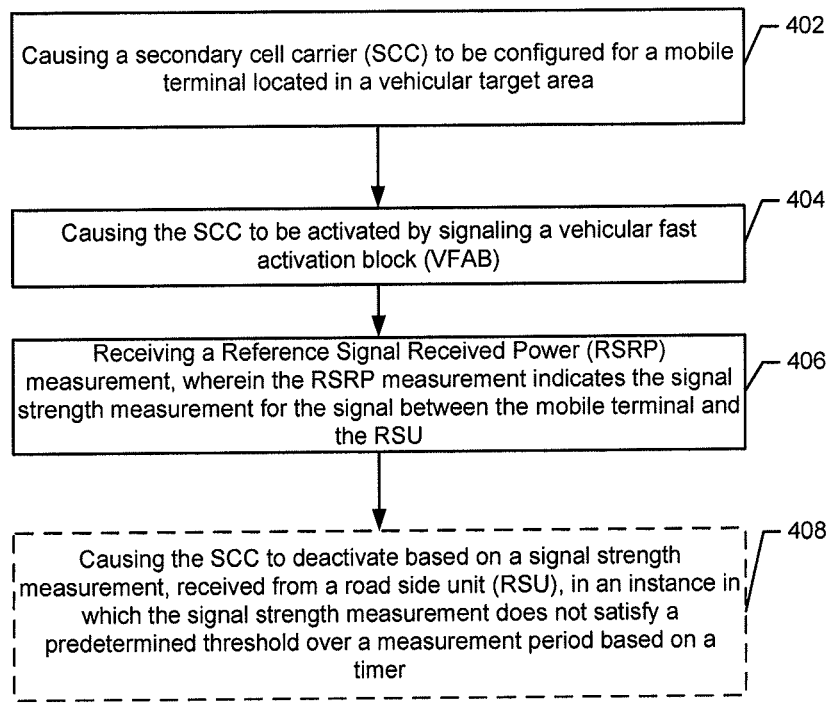
Figure 5:
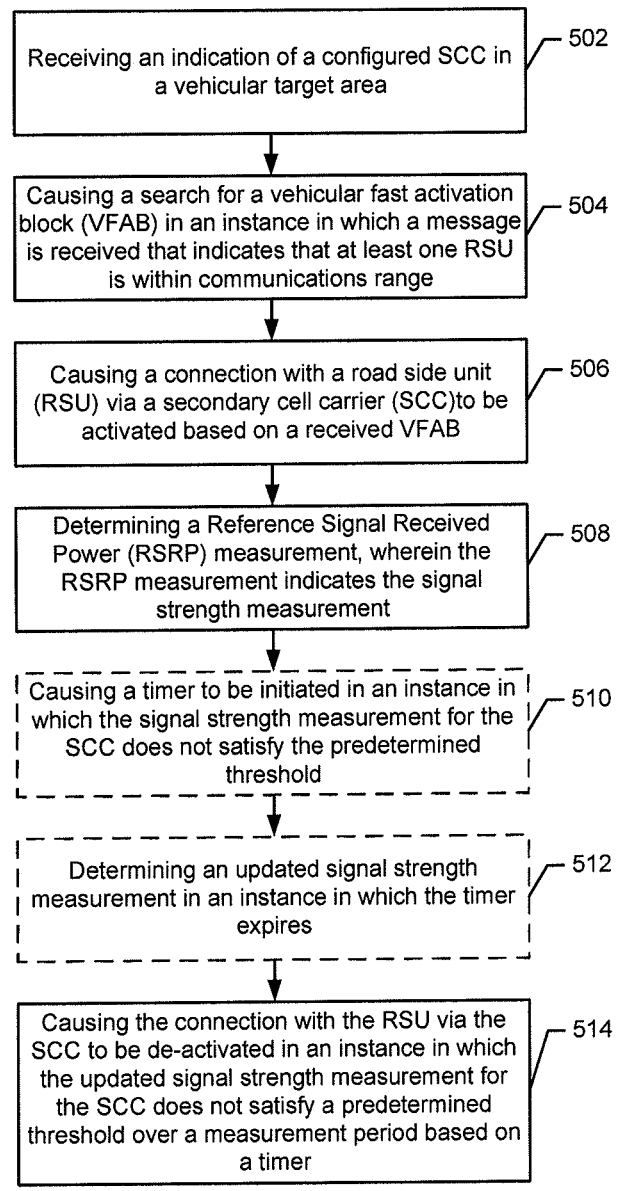

Having thus described the example embodiments of the invention in general terms, reference will now be made to the accompanying drawings, which are not necessarily drawn to scale, and wherein:

FIG. 1 is a schematic representation of an example ITS that may benefit from an embodiment of the present invention;

FIG. 2 is a block diagram of an example apparatus that may be embodied by an example mobile terminal in accordance with one embodiment of the present invention;

FIG. 3 is an overview diagram illustrating an example ITS operating according to an embodiment of the present invention;

FIG. 4 is a flow chart illustrating operations performed by an example access point in accordance with one embodiment of the present invention; and FIG. 5 is a flow chart illustrating operations performed by an example mobile terminal in accordance with one embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or application specific integrated circuit for a mobile phone or a similar integrated circuit in server, a cellular network device, or other network device.

An ITS system based on cellular communications, according to some example embodiments, is disclosed herein. The cellular ITS system may be implemented using LTE interfaces that enable various connections between mobile terminals, RSUs and access points. For example, an interface between a mobile terminal and an RSU, may be based on an LTE mobile terminal to relay node air interface used on cellular bands. An example interface between the RSU and the access point may be based on an LTE relay node to access point interface used on cellular bands. Additionally, a direct connection between a mobile terminal and an access point may also be implemented based on an LTE mobile terminal to access point interface.

Although the method, apparatus and computer program product may be implemented in a variety of different systems, one example of such a system is shown in FIG. 1, which includes a first communication device (e.g., mobile terminal 10) that is capable of communication via a access point 12, such as a base station, a macro cell, a Node B, an evolved Node B (eNB) or other access point or via an RSU 14, such as a vehicular relay node (V-RN), with a network 16 (e.g., a core network). While the network may be configured in accordance with LTE or LTE-Advanced (LTE-A), other networks may support the method, apparatus and computer program product of embodiments of the present invention including those configured in accordance with wideband code division multiple access (W-CDMA), CDMA2000, global system for mobile communications (GSM), general packet radio service (GPRS) and/or the like.

As is described herein, the mobile terminal 10 may be configured as a vehicular mobile terminal for use with an ITS. In some example embodiments, the network 16 such as via the access point 12, may receive an indication that the mobile terminal 10 is a vehicular mobile terminal. Alternatively or additionally, the network 16, such as by the access point 12, may determine that the mobile terminal 10 is a vehicular mobile terminal in an instance in the mobile terminal 10 is rapidly moving within a macro cell or across smaller cells. In particular, once determined that the mobile terminal 10 is a vehicular mobile terminal, it may be caused to provide access stratum (AS) or non-access stratum (NAS) level mobile terminal capability signaling, subscription information, and/or the mobile terminal 10 may be configured to provide an indication that the mobile terminal 10 supports ITS/vehicular related signaling. The network 16, such as by an access point 12, may continuously gather mobile terminal location information from various sources within the cellular network (e.g. positioning based on global position system, GPS, Observed Time Difference of Arrival, cell identity and Timing Advance) or outside the cellular network (e.g. road tolling) to allow Evolved Universal Terrestrial Radio Access Network (E-UTRAN) to determine the location of a mobile terminal within the vehicular target area.

In an embodiment, an RSU 14 may be embodied as a transparent inband relay, without, for example, a cell ID, the RSU 14 may be configured to perform an initial cell access as a special mobile terminal to a macro-cell access point within coverage area. For example, as is described herein, an inband RSU refers to the backhaul link between the RSU and its donor access point and the access link between mobile terminal and RSU are on the same carrier, and therefore share the same inband resources. In some examples, the backhaul link may be efficiently used as a directional antenna, for example with an RSU antenna and a donor access point antenna judiciously placed may result in transmission modes supporting high-data rates at relatively high Signal to Interference plus Noise Ratio (SINR) operating points. For example and as is discussed in LTE release-10, a specified Type 1 non-transparent relay, such as the RSU 14, may achieve downlink synchronization and perform initial cell access procedure over the air as a special mobile terminal.

In some example embodiments, the mobile terminal 10 may be in data communications with the access point 12, such that a communication that is transmitted by the access point 12 is received by the mobile terminal 10 and vice versa. In such cases the communications link between the mobile terminal 10 and the access point 12 is referred to as the primary cell carrier (PCC). In some example embodiments the mobile terminal 10 may be in communications with the RSU 14, such that a communication that is transmitted by the RSU 14 is received by the mobile terminal 10 and vice versa. In such cases, the RSU 14 is in communications with the access point 12. The communications link between the mobile terminal 10 and RSU 14 is referred to as the secondary cell carrier (SCC).

In some example embodiments, the PCC provides a link between the mobile terminal 10 and the access point 12. The PCC is also configured with Uplink (UL) and Downlink (DL) resources, such as carrier frequency (e.g. frequency-division duplex) or UL/DL subframes (e.g. time division duplex). In some example embodiments, the following non-exclusive listing of mechanisms may be used with respect to the PCC for Security inputs, Non-Access Stratum (NAS) mobility functions, Physical Uplink Control Channel (PUCCH) transmission, RRC connection re-establishment, and/or radio link monitoring. In some example embodiments, the PCC is configured to be altered by a handover command and is not configured to be deactivated or cross scheduled.

In some example embodiments, the SCC is configured to provide an link between the mobile terminal 10 and the access point 12 via an RSU 14. Configuration of the SCC may be accomplished, for example, by dedicated signaling (e.g. RRC Reconfiguration). In some example embodiments, the SCC may be activated/deactivated, such as by the mobile terminal 10 and/or by the access point 12. The SCC may be cross scheduled from a PCell or from other SCells in a single location and may or may not be configured to carry system information. For example, a mobile terminal, such as mobile terminal 10, may be configured to acquire system information for an SCell by dedicated signaling during RRC Reconfiguration.

The network 16 may include a collection of various different nodes, devices or functions that may be in communication with each other via corresponding wired and/or wireless interfaces. For example, the network may include one or more cells, including access point 12 and which may serve a respective coverage area. The access point could 12 be, for example, part of one or more cellular or mobile networks or public land mobile networks (PLMNs). In turn, other devices such as processing devices (e.g., personal computers, server computers or the like) may be coupled to the mobile terminal 10 and/or other communication devices via the network.

A communication device, such as the mobile terminal 10 (also known as user equipment (UE) and/or an onboard unit (OBU)), may be in communication with other communication devices or other devices via the access point 12, the RSU 14 and, in turn, the network 16. In some cases, the communication device may include an antenna for transmitting signals to and for receiving signals from an access point 12 and/or the RSU 14.

In some example embodiments, the mobile terminal 10 may be a mobile communication device such as, for example, a vehicle-mounted transceiver unit, a mobile telephone, portable digital assistant (PDA), pager, laptop computer, or any of numerous other hand held or portable communication devices, computation devices, content generation devices, content consumption devices, or combinations thereof. As such, the mobile terminal 10 may include one or more processors that may define processing circuitry either alone or in combination with one or more memories. The processing circuitry may utilize instructions stored in the memory to cause the mobile terminal 10 to operate in a particular way or execute specific functionality when the instructions are executed by the one or more processors. The mobile terminal 10 may also include communication circuitry and corresponding hardware/software to enable communication with other devices and/or the network 16.

In one embodiment, for example, the mobile terminal 10, the access point 12 and/or the RSU 14 may be embodied as or otherwise include an apparatus 20 as generically represented by the block diagram of FIG. 2. While the apparatus 20 may be employed, for example, by a mobile terminal 10, an access point 12 or an RSU 14, it should be noted that the components, devices or elements described below may not be mandatory and thus some may be omitted in certain embodiments. Additionally, some embodiments may include further or different components, devices or elements beyond those shown and described herein.

As shown in FIG. 2, the apparatus 20 may include or otherwise be in communication with processing circuitry 22 that is configurable to perform actions in accordance with example embodiments described herein. The processing circuitry may be configured to perform data processing, application execution and/or other processing and management services according to an example embodiment of the present invention. In some embodiments, the apparatus, the processing system or the processing circuitry may be embodied as a chip or chip set. In other words, the apparatus or the processing circuitry may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus or the processing circuitry may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 22 (e.g. processing system) may include a processor 24 and memory 28 that may be in communication with or otherwise control a communication interface 26 and, in some cases, a user interface 29. As such, the processing circuitry may be embodied as a circuit chip (e.g., an integrated circuit chip) configured (e.g., with hardware, software or a combination of hardware and software) to perform operations described herein. However, in some embodiments taken in the context of the mobile terminal 10, the processing circuitry may be embodied as a portion of a mobile computing device or other mobile terminal.

The user interface 29 (if implemented) may be in communication with the processing circuitry 22 to receive an indication of a user input at the user interface and/or to provide an audible, visual, mechanical or other output to the user. As such, the user interface may include, for example, a keyboard, a mouse, a joystick, a display, a touch screen, a microphone, a speaker, and/or other input/output mechanisms. The apparatus 20 need not always include a user interface. For example, in instances in which the apparatus is embodied as an access point 12 and/or an RSU 14, the apparatus may not include a user interface. As such, the user interface is shown in dashed lines in FIG. 2.

The communication interface 26 may include one or more interface mechanisms for enabling communication with other devices and/or networks. In some cases, the communication interface may be any means such as a device or circuitry embodied in either hardware, or a combination of hardware and software that is configured to receive and/or transmit data from/to a network 16 and/or any other device or module in communication with the processing circuitry 22, such as between the mobile terminal 10, the access point 12 and the RSU 14. In this regard, the communication interface may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods.

In an example embodiment, the memory 28 may include one or more non-transitory memory devices such as, for example, volatile and/or non-volatile memory that may be either fixed or removable. The memory may be configured to store information, data, applications, instructions or the like for enabling the apparatus 20 to carry out various functions in accordance with example embodiments of the present invention. For example, the memory could be configured to buffer input data for processing by the processor 24. Additionally or alternatively, the memory could be configured to store instructions for execution by the processor. As yet another alternative, the memory may include one of a plurality of databases that may store a variety of files, contents or data sets. Among the contents of the memory, applications may be stored for execution by the processor in order to carry out the functionality associated with each respective application. In some cases, the memory may be in communication with the processor via a bus for passing information among components of the apparatus.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 28 or otherwise accessible to the processor. As such, whether configured by hardware or by a combination of hardware and software, the processor may represent an entity (e.g., physically embodied in circuitry—in the form of processing circuitry 22) capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

A method, apparatus and computer program product of an example embodiment of the present invention is configured to provide an ITS system that is implemented via LTE interfaces. In some example embodiments, carrier aggregation mechanisms for lower-layer communications are disclosed herein to optimize user plane aspects for vehicular communications using, for example, LTE architecture.

In some example embodiments, one or more mobile terminals 10 may be connected to the Evolved Universal Terrestrial Radio Access Network (E-UTRAN) via carrier aggregation on the user plane, where the PCC is configured for a connection between the mobile terminal 10 and the access point 12. The PCC is further configured to provide continuous coverage for signaling on the control plane and limited user plane capacity. The SCC provides, on the other hand, additional user plan capacity and may also be configured for communications between the mobile terminal and the access point 12 via an RSU 14. For example, the SCC may provide additional data bandwidth and additional services to the mobile terminal 10 when connected. In some example embodiments, the systems and methods described herein are configured such that the SCC is activated in instance in which a mobile terminal 10 is in communications range of an RSU 14.

In some example embodiments, the SCC may be pre-configured for each of the mobile terminals 10 within a vehicular target area. The mobile terminals 10 may receive configuration information for an RSU 14 via higher layer signaling to the mobile terminal 10 on the PCC. For example, the PCC may be configured such the mobile terminal 10 receives an indication of upcoming RSUs 14 for potential connection.

As is described herein, the vehicular target area is defined by the communications range of an access point, such as access point 12. A vehicular target area generally includes a plurality of RSUs that are in the communications range of an access point. A vehicular target area advantageously, for example, allows for a security context to be maintained among RSU 14 within an ITS target area, which further supports the high mobility of a mobile terminal 10.

The SCC may be activated, such as by the access point 12, over the PCC via a L1/medium access control (MAC) control element referred to herein as a Vehicular Fast Activation Block (VFAB). The VFAB is broadcasted to all mobile terminals 10 within an RSU 14 cell coverage area. The VFAB provides configuration information that the mobile terminal 10 may use when connecting to the RSU 14 and further functions as a means to activate the SCC. The VFAB may include, but is not limited to, an RSU Control Format Indicator (VRNCFI) which may include a bitmap indicating a RSU specific pre-defined configuration. Alternatively or additionally, a mobile terminal 10 may start to search for a VFAB transmission in an instance in which the mobile terminal 10 is notified by the access point 12 that there are RSU's within the coverage area of the access point and thus an SCC connection is available.

In some example embodiments, the VFAB may be transmitted by the access point 12 on the Physical Broadcast Channel (P-BCH), and in other example embodiments on carrier F2. The VFAB may be configured to contain an SCC activation L1/MAC Control Element and a cyclic redundancy check (CRC) field. The CRC field may be configured for error detection and may also be configured to check that primary and secondary synchronization channels (P/S-SCH) detection is not erroneous. For example, in an instance in which CRC successful, synchronisation is implicitly assumed by the mobile terminal since physical broadcast channel (P-BCH) is configured to be received once and synchronisation time-frequency parameters are determined from P/S-SCH detector).

In some example embodiments, the VFAB may be mapped to subframes #0 and #5 containing the P/S-SCH excluding subframe #0 at system frame number (SFN) mod 4=0 which may be used for a master information block (MIB) in an instance in which an MIB is also transmitted (e.g. the VFAB is transmitted with a periodicity matching that of the P/S-SCH of 5 ms). The VFAB and MIB may be attached to separate broadcast channel (BCH) transport blocks before mapping to separate physical resources on P-BCH. By attaching the VFAB and the MIB to different blocks, multiplexing of VFAB and MIB on the same BCH transport block is avoided. The mobile terminal 10 may then be synchronized to the RSU 14 and as a result, the RSU 14 may then cause the SCC to be activated within 5 ms. Alternatively or additionally, a multiple of 5 ms may be used in an instance in which P/S-SCH detection and VFAB decoding fail and/or in an instance in which a weak signal is experienced when a mobile terminal initially moves within coverage of the RSU.

In some example embodiments, the SCC may be implicitly de-activated in a mobile terminal based on RSU Reference Signal Received Power (RSRP) measurements using a de-activation threshold value ($F_{RSU}$) and de-activation timer value ($T_{RSU}$) configured by higher-layer signaling on the PCC. For example, a mobile terminal 10 may be moving out of coverage of a RSU 14 and thus may experience weak signals. The signal strength may be readily measured from reference signals, such by a signal strength measurement such as the RSRP, transmitted continuously by the RSU 14. In an instance in which, the measured RSRP falls below a Threshold value, $F_{RSU}$, the mobile terminal 10 may set an internal timer with a timer value, $T_{RSU}$. The threshold value and the timer value may be configured by the mobile terminal 10 or may be configured by higher-layer signalling via the PCC. In an instance in which the timer expires, the mobile terminal 10 may cause the RSRP measurement to be updated. In an instance in which the updated RSRP is still below the threshold value $F_{RSU}$, the mobile terminal 10 may de-activate the SCC. The threshold value may be based on specified receiver performance requirements, assumed receiver algorithm implementation in specified mobile terminal and/or the like. The timer value may be based on an RSU category, such as but not limited to, specified transmission power and assumed RSU cell size.

FIG. 3 is an overview diagram illustrating an example ITS according to an embodiment of the present invention. A mobile terminal, such as mobile terminal 10, may be traveling along the arrow 30 within an ITS system as shown. The mobile terminal at various times T1, T2... T6 may experience different behaviors and may be connected via the PCC, and in some instances over the PCC and SCC. In the example ITS system of FIG. 3, there are two access points 12a and 12b and two connected RSUs 14 to each of the access points 12a and 12b. Any number of access points 12 and RSUs 14 may be used in the example ITS systems as described herein.

In an embodiment, an ITS target area 36 is defined by the combined communication range of the access points 12a and 12b, where each access point 12a-12b has a defined range which is shown with reference to solid line 32. In alternate embodiments, an ITS target area may be defined by the communications range of a single access point, or may be defined by the communications range of a plurality of access points. Each RSU 14a-14d also has a defined communications range which is shown with reference to dashed lines 34.

In some example embodiments, carrier aggregation (CA) is configured for an instance in which a mobile terminal is in an RRC Connected state, there is a single RRC Connection and/or there is no change to the Idle mode. In some example embodiments, a RRC configuration information message (e.g VFAB) may be transmitted to pre-configure SCCs using inband RSU's with the same donor access point. The pre-configuration may be transferred on the SCC ($F_2$) to the RSU and to mobile terminal on the PCC ($F_1$). In some example embodiments, the RSU 14 may be configured to enter an RRC_CONNECTED state at the completion of initial cell access procedures. Once in the RRC_CONNECTED state, a mobile terminal 10 may then be configured to connect to an access point 12 via the RSU 14 on the user plane and the control plane. The mobile terminal 10 may further be configured to implicitly re-select the RSU 14 without any handover. In addition, there may be a direct link between the mobile terminal 10 and the access point, 12 for example, during specified initial cell attachment procedures and during handover procedures.

In some example embodiments, the PCC ($F_1$) may be configured on a low frequency band, and may be configured to provide for primary access for a mobile terminal. As is described herein, the PCC ($F_1$) is configured to provide mobility, security and state management, and data plane transport. As is shown with reference to FIG. 3, a mobile terminal may, at times $T_2$ and $T_5$, connect via the PCC ($F_1$) to Access Point A 12 a and Access Point B 12b respectively because they are outside coverage of an RSU 14. In some example embodiments, the PCC ($F_1$) may provide macro cellular coverage for mobile terminals with relatively low data rates supported. The SCC ($F_2$) may be configured on high a frequency band and may be configured to provide opportunistic Secondary Access to provide additional data plane transport at times $T_1$, $T_3$, $T_4$, and $T_6$ via RSU A 14a, RSU B 14b, RSU-C 14c, and RSU-D 14d respectively. In some example embodiments, the SCC ($F_2$) may provide hot spots that result in additional capacity for high-data rates for the mobile terminal.

FIGS. 4 and 5 illustrate example operations performed by a method, apparatus and computer program product, such as apparatus 20 of FIG. 2 in accordance with one embodiment of the present invention are illustrated. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device 28 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIGS. 4 and 5, when executed, convert a computer or processing circuitry into a particular machine configured to perform an example embodiment of the present invention. Accordingly, the operations of FIGS. 4 and 5 define an algorithm for configuring a computer or processing circuitry 22, e.g., processor, to perform an example embodiment. In some cases, a general purpose computer may be provided with an instance of the processor which performs the algorithm of FIGS. 4 and 5 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified as described below. Moreover, in some embodiments additional optional operations may also be included (some examples of which are shown in dashed lines in FIG. 4). It should be appreciated that each of the modifications, optional additions or amplifications below may be included with the operations above either alone or in combination with any others among the features described herein.

FIG. 4 is a flow chart illustrating operations performed by an example access point as the mobile terminal moves through one or more ITS target areas in accordance with one embodiment of the present invention. As shown in operation 402, the apparatus 20 embodied, for example, by an access point 12, may include means, such as the processing circuitry 22, the processor 24, the communications interface 26 or the like, for causing an SCC to be configured for a mobile terminal located in a vehicular target area. In some example embodiments, the SCC is caused, such as by the processing circuitry 22 of access point 12, to be configured using signaling on a PCC. As shown in operation 404, the apparatus 20 embodied, for example, by an access point 12, may include means, such as the processing circuitry 22, the processor 24, the communications interface 26 or the like, for causing the SCC to be activated by causing a VFAB to be signaled. In some example embodiments, the VFAB comprises a RSU control format indication that is configured to provide a bitmap indicating a pre-defined configuration for the RSU. The pre-defined configuration provides configuration information for the RSU and comprises at least one of system bandwidth, Physical Resource Blocks subsets, time-domain duty cycles, or RSU specific reference signals.

As shown in operation 406, the apparatus 20 embodied, for example, by an access point 12, may include means, such as the processing circuitry 22, the processor 24, the communications interface 26 or the like, for receiving a RSRP measurement, wherein the RSRP measurement indicates the signal strength measurement for the signal between the mobile terminal and the RSU. As shown in operation 408, the apparatus 20 embodied, for example, by an access point 12, may include means, such as the processing circuitry 22, the processor 24, the communications interface 26 or the like, for causing the SCC to deactivate based on a signal strength measurement, received from a RSU, in an instance in which the signal strength measurement does not satisfy a predetermined threshold.

FIG. 5 is a flow chart illustrating operations performed by an example mobile terminal as the mobile terminal moves through one or more ITS target areas in accordance with one embodiment of the present invention. As shown in operation 502, the apparatus 20 embodied, for example, by a mobile terminal 10, may include means, such as the processing circuitry 22, the processor 24, the communications interface 26 or the like, for receiving an indication of a configured SCC in a vehicular target area. As shown in operation 504, the apparatus 20 embodied, for example, by a mobile terminal 10, may include means, such as the processing circuitry 22, the processor 24, the communications interface 26 or the like, for causing a search for a VFAB in an instance in which a message is received that indicates that at least one RSU is within communications range.

As shown in operation 506, the apparatus 20 embodied, for example, by a mobile terminal 10, may include means, such as the processing circuitry 22, the processor 24, the communications interface 26 or the like, for causing a connection with a RSU via a SCC to be activated based on a received VFAB. As shown in operation 508 the apparatus 20 embodied, for example, by a mobile terminal 10, may include means, such as the processing circuitry 22, the processor or the like, for determining an RSRP measurement. In some example embodiments, the RSRP measurement indicates the signal strength measurement.

As shown in operation 510, the apparatus 20 embodied, for example, by a mobile terminal 10, may include means, such as the processing circuitry 22, the processor 24, the communications interface 26 or the like, for causing a timer to be initiated in an instance in which the signal strength measurement for the SCC does not satisfy the predetermined threshold. As shown in operation 512, the apparatus 20 embodied, for example, by a mobile terminal 10, may include means, such as the processing circuitry 22, the processor 24 or the like, for determining an updated signal strength measurement in an instance in which the timer expires. As shown in operation 514, the apparatus 20 embodied, for example, by a mobile terminal 10, may include means, such as the processing circuitry 22, the processor 24, the communications interface 26 or the like, for causing the connection with the RSU via the SCC to be de-activated in an instance in which the updated signal strength measurement for the SCC does not satisfy a predetermined threshold.

Advantageously, the apparatus, method and computer program product as described herein enables, for example, fast activation and de-activation of an SCC in mobile terminals moving within a relatively small RSU cell coverage for added user plane capacity, while allowing continuous coverage in macro cell on the PCC for signaling on the control plane and limited user plane capacity.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   for a mobile terminal having a primary cell carrier (PCC) activated to communicate directly with a network access point, causing a secondary cell carrier (SCC) to be configured for the mobile terminal located in a vehicular target area to communicate with the access point via one or more road side units (RSUs) which share a security context within the vehicular target area;
   while the PCC remains activated, causing the SCC to be activated by signaling a vehicular fast activation block (VFAB); and
   de-activating the SCC by sending a signal strength measurement for the SCC from a given one or more RSUs that does not satisfy a predetermined threshold over a measurement period, wherein the SCC becomes de-activated upon expiry of a timer.

2. The method according to claim 1, wherein the signal strength measurement is a Reference Signal Received Power (RSRP) measurement for a signal between the mobile terminal and the one or more RSUs.

3. The method according to claim 1, wherein the SCC is caused to be configured using signaling on the PCC.

4. The method according to claim 1, wherein the VFAB comprises a RSU control format indication that is configured to provide a bitmap indicating a pre-defined configuration for the one or more RSUs.

5. The method according to claim 4, wherein the pre-defined configuration provides configuration information for the one or more RSUs and comprises at least one of system bandwidth, Physical Resource Blocks subsets, time-domain duty cycles, or RSU specific reference signals.

6. The method according to claim 1, further comprising:
   causing the VFAB to be broadcast to all mobile terminals within a coverage area defined by the one or more RSUs.

7. The method according to claim 1, further comprising sending the predetermined threshold and the measurement period on the PCC.

8. An apparatus comprising:
   at least one processor; and
   at least one memory including computer program code, the at least one memory and the computer program code configured to, with the at least one processor, cause the apparatus to at least:
   for a mobile terminal having a primary cell carrier (PCC) activated to communicate directly with a network access point, cause a secondary cell carrier (SCC) to be configured for the mobile terminal located in a vehicular target area to communicate with the access point via one or more road side units (RSUs) which share a security context within the vehicular target area;
   while the PCC remains activated, cause the SCC to be activated by signaling a vehicular fast activation block (VFAB); and
   deactivate the SCC by sending a signal strength measurement for the SCC from a given one or more RSUs that does not satisfy a predetermined threshold over a measurement period, wherein the SCC becomes de-activated upon expiry of a timer.

9. The apparatus according to claim 8, wherein the signal strength measurement is a Reference Signal Received Power (RSRP) measurement for a signal between the mobile terminal and the one or more RSUs.

10. The apparatus according to claim 8, wherein the SCC is caused to be configured using signaling on a primary cell carrier (PCC).

11. The apparatus according to claim 8, wherein the VFAB comprises a RSU control format indication that is configured to provide a bitmap indicating a pre-defined configuration for the one or more RSUs.

12. The apparatus according to claim 11, wherein the pre-defined configuration provides configuration information for the one or more RSUs and comprises at least one of system bandwidth, Physical Resource Blocks subsets, time-domain duty cycles, or RSU specific reference signals.

13. The apparatus according to claim 8, wherein the at least one memory including the computer program code is further configured to, with the at least one processor, cause the apparatus to:
   cause the VFAB to be broadcast to all mobile terminals within a coverage area defined by the one or more RSUs.

14. A method comprising:
   causing a mobile terminal to search for a vehicular fast activation block (VFAB) in an instance in which a message is received at the mobile terminal that indicates that at least one road side unit (RSU) is within communications range of the mobile terminal;
   while maintaining as active a primary cell carrier (PCC) directly between the mobile terminal and a network access point, activating a secondary cell carrier (SCC) between the mobile terminal and the access point via a direct connection between the mobile terminal and a road side unit (RSU) based on a received VFAB; and
   de-activating the SCC and thereby de-activating the direct connection with the RSU in an instance in which a signal strength measurement for the SCC, received at the mobile terminal from the RSU, does not satisfy a predetermined threshold over a measurement period based on a timer.

15. The method according to claim 14, further comprising:
   receiving an indication of a configured SCC in a vehicular target area.

16. The method according to claim 14,
wherein the signal strength measurement is a Reference Signal Received Power (RSRP) measurement.

17. The method according to claim 14, further comprising:
causing the timer to be initiated in an instance in which the signal strength measurement for the SCC does not satisfy the predetermined threshold;
causing the signal strength measurement to be updated by sending a reference signal in response to the timer expiring; and
causing the connection with the RSU via the SCC to be de-activated in an instance in which the updated signal strength measurement for the SCC does not satisfy the predetermined threshold.

18. The method according to claim 14, wherein the VFAB comprises a road side unit control format indication that is configured to provide a bitmap indicating a pre-defined configuration.

19. The method according to claim 18, wherein the pre-defined configuration comprises at least one of system bandwidth, Physical Resource Blocks subsets, time-domain duty cycles, RSU specific reference signals.

20. The method according to claim 14, wherein the predetermined threshold and the measurement period are received on the PCC.

* * * * *